United States Patent [19]

Davis

[11] Patent Number: 4,549,527
[45] Date of Patent: Oct. 29, 1985

[54] SOLID STATE TEMPERATURE CONTROLLER

[75] Inventor: John Davis, Shreveport, La.

[73] Assignee: The Frymaster Corporation, Shreveport, La.

[21] Appl. No.: 512,198

[22] Filed: Jul. 8, 1983

[51] Int. Cl.[4] ............................................. A47J 27/00
[52] U.S. Cl. .................................... 126/374; 219/442; 219/419; 219/510
[58] Field of Search .................... 126/374, 351; 431/1; 236/94, 20 A; 219/419, 437, 441, 442, 475, 510; 99/359, 403

[56] References Cited

U.S. PATENT DOCUMENTS

| 3,800,779 | 4/1974 | Moore et al. | 126/374 |
| 3,938,498 | 2/1976 | Price | 126/374 |
| 3,977,390 | 8/1976 | Fogel et al. | 126/374 |
| 4,102,330 | 7/1978 | Hutchinson | 126/374 |
| 4,465,228 | 8/1984 | Mori et al. | 126/374 X |

Primary Examiner—Randall L. Green
Attorney, Agent, or Firm—Hubbard, Thurman, Turner & Tucker

[57] ABSTRACT

A temperature controller for a deep fat fryer including a temperature sensing circuit that determines the temperature of cooking oil in the deep fat fryer and which is connected to a temperature control circuit that controls the deep fat fryer heat source in providing heat to the cooking oil in response to a set temperature from an external input device. The control circuit also includes an anticipation circuit that variably modulates the heating source before the cooking oil temperature approaches the set temperature. The temperature control circuit further includes a resistor divider network that provides selected voltages representing reference temperatures and which are input to several operational amplifiers for controlling the heat source.

15 Claims, 6 Drawing Figures

4,549,527

SOLID STATE TEMPERATURE CONTROLLER

BACKGROUND AND SUMMARY OF THE INVENTION

1. Feel the Invention

This invention relates to cooking devices and more specifically to cooking devices including temperature control circuitry to control the heat of the medium used for cooking.

2. Description of the Prior Art

Temperature controlled cooking devices have existed for many years. In the simplest form the cooking appliance included a potentiometer to set the amount of heat provided to the medium in the appliance for cooking food. One example of such an appliance is a deep fat fryer. A potentiometer in an electric deep fat fryer provides the temperature input used to determine the amount of heat added to the cooking medium or cooking oil. The potentiometer is used with a thermostat to insure that a sufficient amount of heat is being added to the cooking medium or cooking oil without exceeding the desired temperature.

Later developments of temperature control included mechanical mechanisms such as a motor and cam mechanism to provide time dependent control of the temperature. However the need still existed for a inexpensive and reliable means to control the temperature in a manner to insure efficient cooking and at the same time insure accurate temperature control.

SUMMARY OF THE INVENTION

In accordance with the present invention a cooking appliance is provided that includes a temperature circuit for determining a cooking medium temperature and a control circuit for controlling the amount of heat provided to the cooking medium in response to an external input set temperature with the control circuitry further including anticipation circuitry for modulating the heat provided to the cooking medium when the temperature of the cooking medium approaches the set temperature. In one embodiment of this invention the cooking appliance is provided wherein the temperature control circuit further includes a melt cycle timer for providing intermittant heat to the cooking medium until the cooking medium reaches a selected temperature. In a further embodiment the temperature control circuitry includes a burn time circuit that provides a minimum heat time for heating the cooking medium. In a still further embodiment the cooking appliance includes overheat control circuitry for detecting the overheating of the cooking medium and in response thereto preventing any additional heat from being provided to the cooking medium. In a still further embodiment the overheat control circuitry further includes an alarm to provide notification to the user of the occurence of the overheating of the cooking medium.

Another embodiment of this invention includes a temperature controller for a deep fat fryer that includes a temperature sensing circuit for determining the temperature of the cooking oil in the deep fat fryer and a temperature control circuit connected to the deep fat fryer heat source for controlling the amount of heat provided to the cooking oil in response to a set temperature or designated temperature from an external input. The control circuit further includes an anticipation circuit that modulates or moderates the heat source when the cooking oil temperature approaches the set or designated temperature. In this embodiment the temperature control circuit includes a precision resistor divider network that provides selected voltages to a plurality of operational amplifiers that control the heat source. The temperature sensing circuit further includes a temperature dependent resistor connected to a constant current source to provide a voltage indicative of the cooking oil temperature to the plurality of operational amplifiers of the temperature control circuit. In an embodiment where the deep fat fryer heat source is natural gas, the operational amplifiers are connected to an electronically actuated burner valve thus providing burner valve control from the temperature control circuitry.

A further embodiment of this invention includes a deep fat fryer with a vat containing cooking oil heated by heat source controlled by a temperature controller that further includes a temperature sensing circuit for determining the temperature of the cooking oil and a temperature control circuit for controlling the amount of heat provided to the cooking oil from a heat source in response to a set designated temperature. The control circuit includes an anticipation circuit for moderating the heat provided to the cooking oil when the temperature of the cooking oil approaches the set temperature. In this embodiment the temperature control circuit further includes a melt cycle timer circuit for providing intermittant heat to the cooking oil until the cooking oil reaches a selected temperature. The temperature control circuit also includes a burn time circuit that provides a minimum heat time for heating the cooking oil. The deep fat fryer further includes an overheat control circuit for detecting the overheating of the cooking oil and in response thereto preventing additional heat from being added to the cooking oil.

BRIEF DESCRIPTION OF THE DRAWINGS

The novel features believed characteristic of the invention are set forth in the appended claims the invention itself, however, as well as other features and advantages thereof, will be best understood by reference to the detailed description which follows, read in conjunction with the accompanying drawings wherein:

DESCRIPTION OF THE PREFERRED EMBODIMENT

The present invention is directed towards a solid state controller for a cooking appliance. This controller provides the electronic control of cooking temperature while also providing visual and/or audio indication of trouble situations. Furthermore, in certain trouble situations the controller provides corrective action. The controller is intended to provide accurate temperature control and high reliability at a low cost.

Figure 1A:
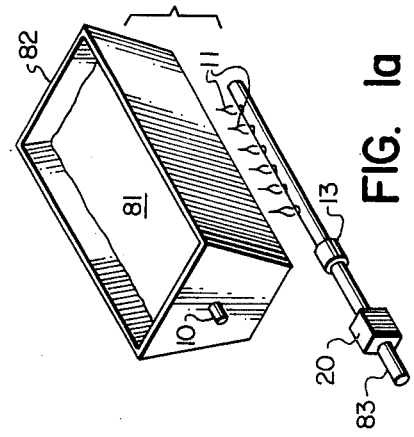
FIG. 1a is a pictorial view of a cooking appliance including components of the cooking appliance controller.
Figure 1:
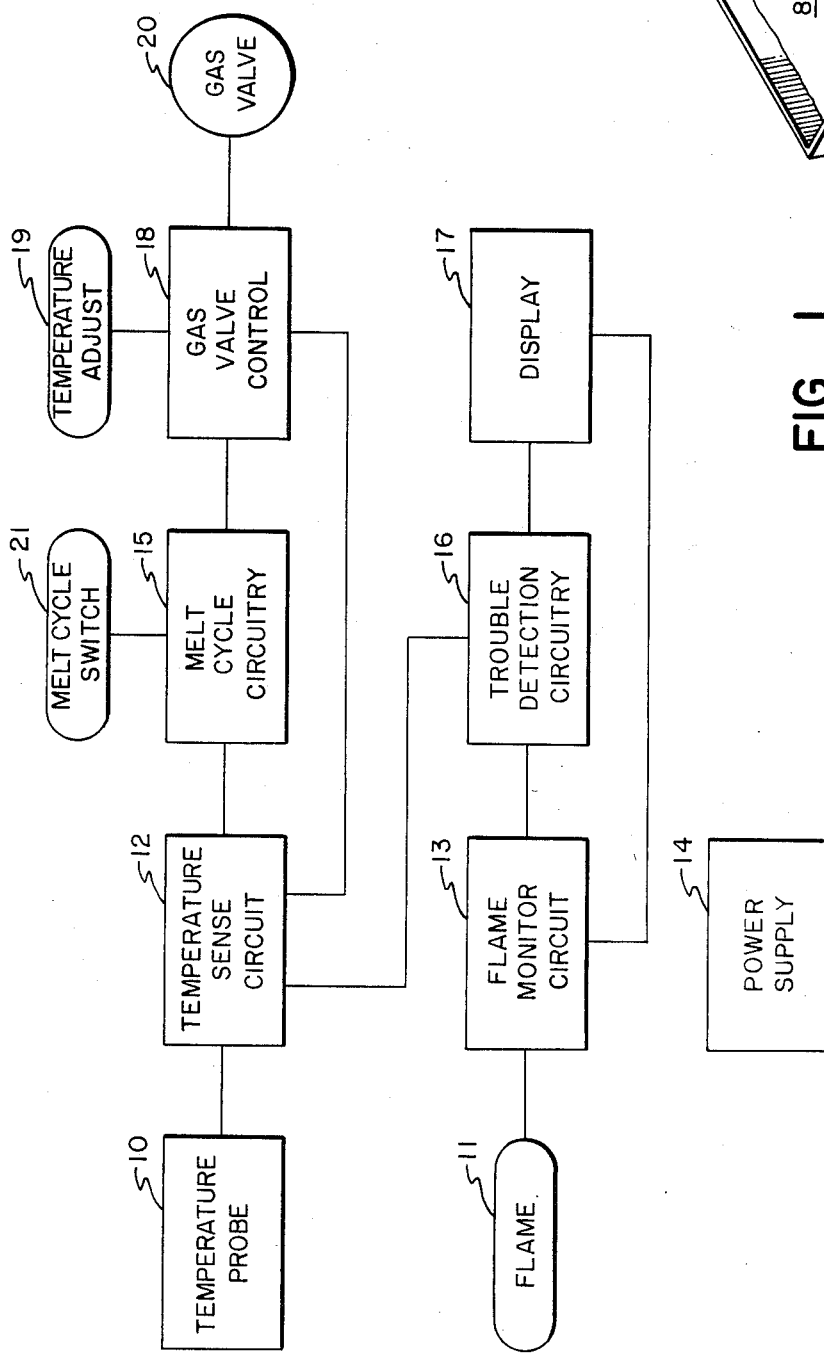
FIG. 1 is a block diagram of the cooking appliance controller.

A block diagram of this invention is illustrated in FIGURE 1. The user provides a temperature input via block 19 that consists of temperature adjust information. This input is the designated temperature for cooking or the set temperature. This information is input into block 18 which represents the gas valve control circuitry. The gas valve control circuitry compares the set temperature with the actual cooking temperature provided by the temperature probe 10 input through the temperature sense circuit 12. If there is a difference between the set temperature and the temperature sensed then the gas valve 20 is adjusted accordingly. In the preferred embodiment the user may control the cooking temperature between the values of 200° F. to 375° F.

In a preferred embodiment, the controller is fabricated for use with a gas fired deep fat fryer in which the cooking medium is cooking oil or shortening. In that application a melt cycle is provided to allow for the proper melting of a shortening or cooking oil in the cooking appliance. The melt timing cycle is five seconds with heat on and twenty seconds with heat off. This melt cycle is provided by the melt cycle circuitry 15 of the controller in FIG. 1. The melt cycle is initiated by the user from the melt cycle switch 21 or if the temperature of the cooking oil in the cooking appliance falls below a low limit temperature.

The controller display 17 displays the presence of power, the presence of a heat signal to the gas valve, an indication of either the melt cycle or the occurence of the second high temperature limit, and a general trouble indication. In the preferred embodiment, the trouble indication represents the existence of a high temperature condition or the absence of the pilot light flame which is provided by the flame indicator 11 through the flame monitor circuit 13.

The power supply for the controller 14 provides in the preferred embodiment a DC (direct current) voltage of 12 volts.

FIG. 1a is a pictorial view of a cooking appliance including a cooking vat 82 containing cooking oil 81. Vat 82 includes the temperature probe 10 to sense the temperature of the oil 81. The vat 81 is heated by flame 11 from a gas line 83 controlled by valve 20 and including flame monitor 13.

Figure 2A:
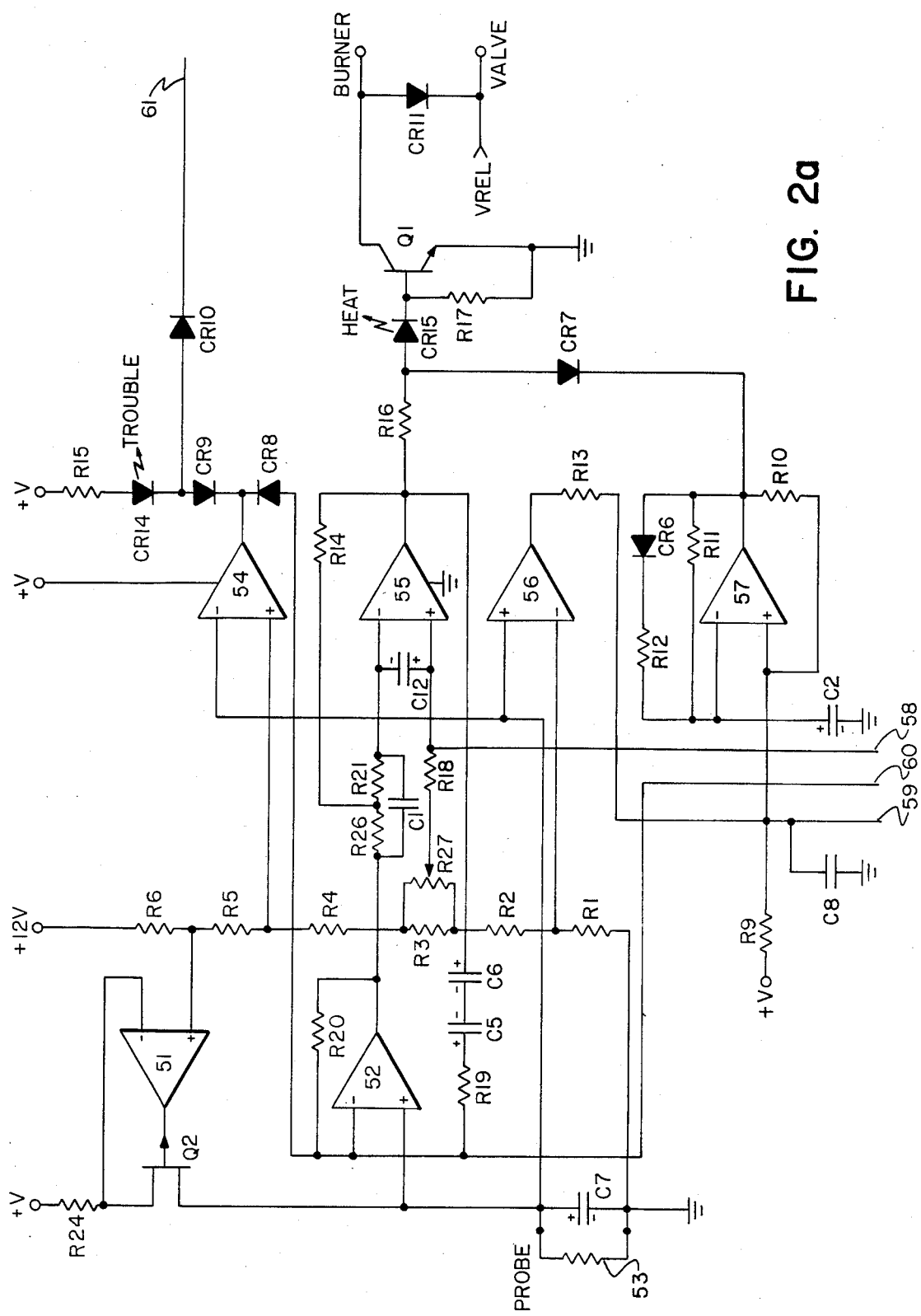
FIG. 2a is a partial schematic diagram of the cooking appliance controller illustrating the gas valve, control cycle circuitry, trouble detection circuitry and temperature sense circuitry.

A partial schematic of the controller of FIG. 1 is illustrated in FIG. 2a. Referring to FIG. 2a, a precision voltage divider is provided by resistences R6, R5, R4, R3, R2, and R1 that are connected between the regulated power supply voltage and the circuit ground. In the preferred embodiment the value of these resistences are selected to correspond to the resistance of a temperature probe at the selected control temperatures of a 135° F., 200° F., 375° F., and 410° F.

The temperature probe 10 of FIG. 1 is illustrated as the temperature sensing resistor 53 connected across the filter compacitor C7 in FIG. 2a. The temperature probe resistor 53 and compacitor C7 are connected to a constant current source consisting of a field effect transistor Q2 and an operational amplifier 51. This circuit configuration insures that the same current that flows through the temperature probe 10 is the same as the current that flows through the precision voltage divider network of resistors R1 through R6 previously discussed.

The gas valve control circuitry 18 of FIG. 1 is illustrated in FIG. 2a as including the operational amplifier 55, the light emitting diode (LED) CR15 (the heat indicator) and the regulating transistor Q1 that is connected to the gas burner valve 20 (of FIG. 1). This circuitry senses the difference between the temperature probe resistor 53 and the temperature designated from potentiometer R27 to operate the burner valve according, unless overridden by a high limit test switch. The temperature potentiometer R27 is adjusted by the user to select a cooking temperature between 200° and 375° F.

The gas valve control circuitry 18 also includes a temperature rate of change anticipation circuit. The anticipation circuit is provided to accurately maintain the temperature when the temperature of the cooking appliance is being altered over a wide temperature range. Such a temperature adjustment would occur during melt cycle or when food that is to be cooked is placed into or removed from the cooking appliance. The problem arises when heat is applied to the cooking appliance to compensate for a lowering of temperature caused by the uncooked food being placed in the appliance for cooking. The temperature normally rises after a time delay from the time that the heat is applied. Once the set point temperature is reached and the heat is removed the temperature lag time results in the temperature continuing to rise and overshooting the set temperature point. The anticipation circuit in the present invention prevents the overshoot by modulating the amount of heat that is added to the cooking appliance when the set point is approached. This modulation is, in fact, the turning off and on of heat as the temperature approaches the set temperature point. Therefore, abrupt changes in the temperature of the cooking appliance can be moderated. In FIG. 2a the temperature rate of change anticipator circuitry includes operational amplifier 52 which is connected to the gas valve controller operational amplifier 55. Operational amplifier 55 is connected to the network of R26, R21, and C1. This network in combination with the feedback resistor R14 effectively lowers the set temperature input to operational amplifier 55 causing the gas valve to cut off before the actual set temperature is reached. Operational amplifier 52 starts the intermittent operation of the gas valve through operational amplifier 55 from the time constants of the network of R19, R20, C5 and C6. This intermittent operation continues until the actual set temperature is reached. The result of the operation of this ancipation circuitry is that the rate of temperature change is variably reduced at as the temperature measured approaches the actual set temperature. The timing network of resistors R19 and R20 capacitors C5 and C6 are also included to provide for a minimum burn time. In the preferred embodiment, resistor R19 is 10M Ohms and resistor R20 is 100K Ohms and capacitor C5 and C6 are of 1 Microfarid to provide a 10 second minimum burn time.

The melt cycle circuitry is provided by operational amplifier 57 and the connected components. The melt cycle circuitry is basically a user selectable timer consisting of a square wave oscillator including components R11, R12, CR6, and C2. The melt cycle circuitry provides for an intermittent operation of the gas burner valve. In the preferred embodiment, the gas burner valve is on for five seconds and off for twenty seconds. C2 and R11 provides the off time of twenty seconds and C2, R11, R12, and CR6 provide the on time of five seconds. This cycle remains constant while the melt cycle timer is active. Additionally, operational amplifier 56 is provided to shut off the melt cycle timer when the temperature probe detects that the temperature has reached a 180° F. In the melt cycle mode diode CR7 controls the gas valve controller operational amplifier 55.

Operational amplifier 54 is provided as part of the trouble detection circuitry 16 in FIG. 1. Operational amplifier 54 provides a signal to the trouble light emitting diode CR14 when the temperature sensed by the temperature probe exceeds 410° F. Furthermore, operational amplifier 54 is connected by diode CR8 to the input of the operational amplifier 52 to turn off the gas control circuitry when the temperature of 410° F. has been reached.

Figure 2B:
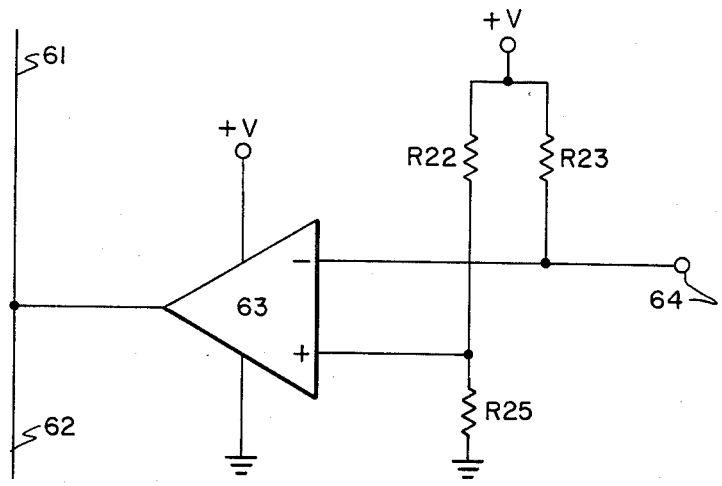
FIG. 2b is a partial schematic diagram of the cooking appliance controller illustrating the flame monitor circuit.

FIG. 2b illustrates the flame monitor circuit 13 of FIG. 1. The flame monitor circuitry 13 includes an operational amplifier 63 that is connected to the pilot light thermocouple (not shown). The thermocouple input is on terminal 64 and is compared with the voltage provided by the voltage divider network of R22 and R25. An output from operational amplifier 63 indicates that the pilot flame has been extinguished or in a system that is equipped with an ignitor that the ignitor has been locked out. The output of operational amplifier 63 includes line 61 that is connected to the trouble light emitting diode CR14 through CR10 (shown in FIG. 2a) and also to CR5 of the circuit in FIG. 2c.

Figure 2C:
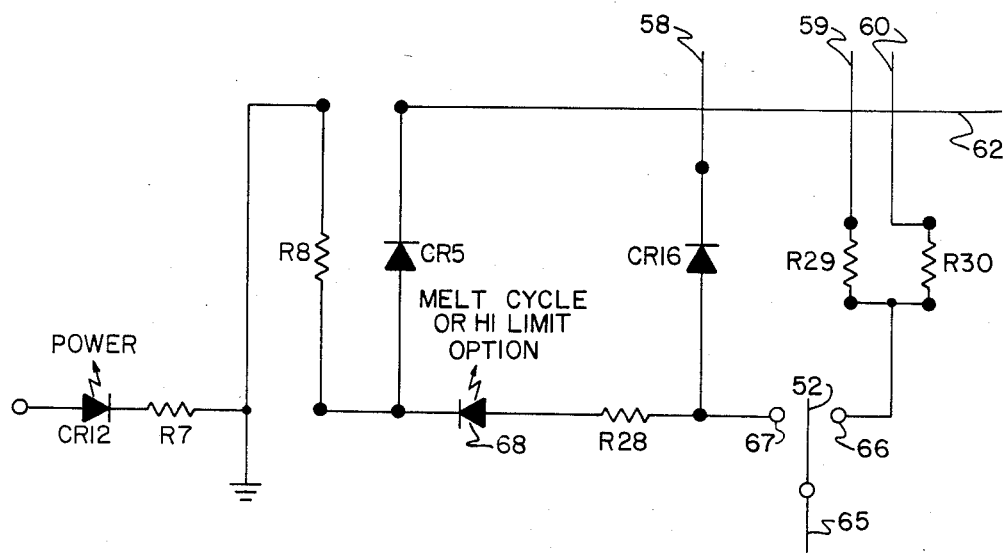
FIG. 2c is a partial schematic diagram of the cooking appliance controller illustrating the power and high temperature limit display.

FIG. 2c illustrates a partial schematic of the controller circuitry that includes the input from the flame monitor circuit 13 on line 62 as discussed. In addition, line 65 originates from a switch S1 shown in FIG. 2d and connects to switch S2 which provides for one of two options. The first option provides the user with the ability to terminate the melt cycle. The second option provides a second high temperature limit indication and the means to force the burner to heat through both high temperature limits. In the first option R8 and R29 are provided and diodes CR5 and CR16 together with resistor R30 are excluded. In the first option the melt cycle is terminated when the line 65 is connected to node 66 from node 67. Note that in the melt cycle mode when line 65 is connected to node 67 that the light emitting diode 68 is illuminated to signify the melt cycle.

In the second configuration or the second high limit indication, resistors R8 and R29 are removed and diodes CR5, CR16 and resistor R30 are provided. The second high limit option provides an indication when the temperature of the cooking appliance exceeds 425° F.

Also included in FIG. 2c is the diode CR12 which provides the indication when power is present.

Figure 2D:
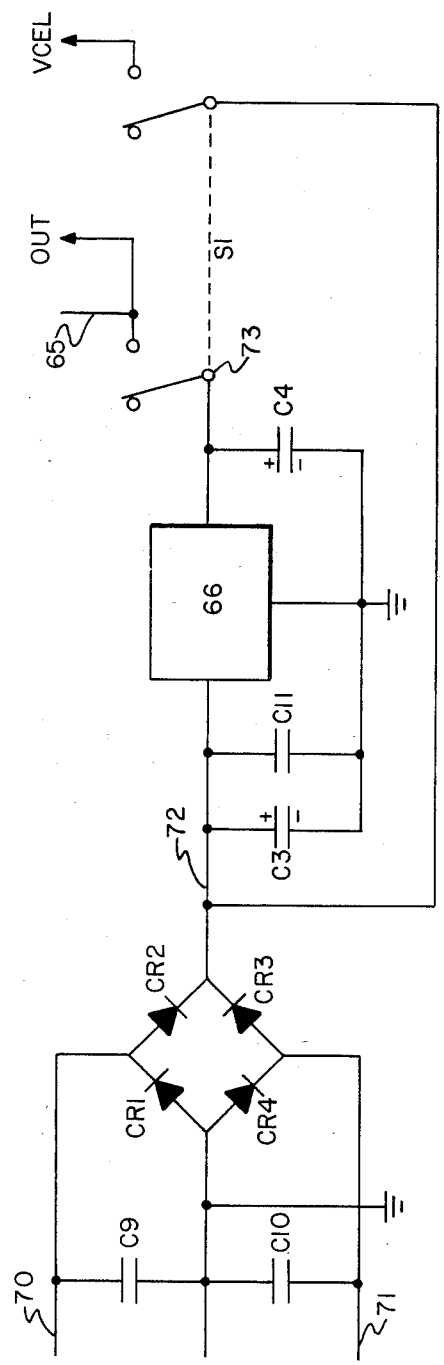
FIG. 2d is a schematic diagram of the power supply for the cooking appliance controller.

Power is provided to the system by the power supply 14 of FIG. 1 illustrated in the schematic form in FIG. 2d. An alternating current source is provided on lines 70 and 71 to the full wave bridge rectifier circuit consisting of diodes CR1, CR2, CR3, and CR4. A filter capacitor C3 and a voltage regulator 66 is provided with bypass capacitors C4 and C11. In the preferred embodiment, the voltage regulator is a 12 volt regulator which will operate in voltages ranging from 10-16 volts rms with 12 volts rms the nominal point. Voltage for appliance switching relays is taken at node 72 and provided to Vrel. The regulated voltage is provided at node 73 which when switch S1 is set, provides the voltage to line 65 previously discussed.

In the preferred embodiment the temperature controller is part of a deep fat apparatus consisting of a vat containing cooking oil that is heated by a natural gas combustion controlled by a gas burner valve. The controller provides an output from Q1 that controls the burner valve and thus controls the amount of heat provided to the cooking oil. Although the preferred embodiment has been disclosed in detail above in terms of a deep fat fryer, it should be obvious to one skilled in the art that applications to an electric deep fat fryer or other cooking appliances such as gas or electric ovens are also appropriate. It maybe then appropriate that various modifications and changes may be made to the instant invention without departing from the spirit and the scope of the invention.

What is claimed is:

1. A temperature controller for a deep fat fryer comprising:
a temperature sensing means for determining a temperature of cooking oil in the deep fat fryer and temperature control means connected to a deep fat fryer heat source for controlling the amount of heat provided to the cooking oil in response to a set temperature from an external input, said control means further including anticipation circuit means for variably modulating the heat source before the cooking oil temperature approaches the set temperature.

2. A temperature controller according to claim 1 wherein said temperature means includes a resistor divider network to provide selected voltages representing reference temperatures to a plurality of operational amplifiers that control the heat source.

3. A temperature controller according the claim 2 wherein said temperature sensing means includes a temperature dependent resistor connected to a constant current source to provide a voltage indicative of the cooking oil temperature to the plurality of operational amplifiers of the temperature control means.

4. A temperature controller according to claim 3 wherein said heat source is the combustion of natural gas controlled by a burner valve, said burner valve controlled by an output signal from the temperature control means.

5. A temperature controller according to claim 3 wherein said heat source is an electrical heating element controlled by a potentiometer said potentiometer controlled by a signal from said temperature control means.

6. A deep fat fryer comprising:
a vat containing cooking oil heated by a heat source controlled by a temperature controller further including a temperature sensing means for determining the temperature of the cooking oil and a temperature control means for controlling the amount of heat provided to the cooking oil from the heat source in response to a set temperature from an external input, said control means including an anticipation circuit means for variably modulating the heat provided to the cooking oil before the temperature of the cooking oil approaches the set temperature.

7. A deep fat fryer according to claim 6 wherein said temperature control means further includes a melt cycle timer means for providing intermittent heat of a constant cycle to the cooking oil until the cooking oil reaches a selected temperature.

8. A deep fat fryer according to claim 7 further including overheat control means for detecting an overheating of the cooking oil and in response thereto preventing additional heat from being provided to the cooking oil.

9. A deep fat fryer according to claim 8 wherein said overheat control means further includes alarm means to provide notification of the occurence of the overheating of the cooking oil.

10. A deep fat fryer according to claim 9 wherein said temperature control means includes a resistor divider network to provide specific voltages representing reference temperatures to a plurality of operational amplifiers which control the heat source.

11. A deep fat fryer according to claim 10 wherein said temperature sensing means includes a temperature dependent resistor in series with a constant current source to provide a voltage indicating the temperature of the cooking oil to the plurality of operational amplifiers of the temperature control means.

12. A deep fat fryer according to claim 11 wherein said heat source is the combustion of natural gas controlled by a burner valve, said burner valve controlled by an output signal from said temperature control means.

13. A deep fat fryer according to claim 11 wherein said heat source is an electrical heat element controlled a potentiometer, said potentiometer being controlled by an output signal from said temperature means.

14. A temperature controller for a deep fat fryer comprising:

- a temperature dependent resistor means connected to a constant current source for providing a first voltage representing a sensed temperature of cooking oil in the fryer;
- a network of resistors connected to a constant voltage source and providing a plurality of selected voltages representing reference temperatures;
- a first circuit means for providing control of a heat source in response to the first voltage and one of the selected voltages and including an anticipation circuit means for variably modulating the heat source to prevent the temperature of the cooking oil in the fryer from exceeding an operator selected temperature as the temperature of the cooking oil approaches the operator selected temperature; and
- a second circuit means for providing control of the heat source in response to an operator selected mode signal to provide intermittent heating of the cooking oil until the temperature of the cooking oil has reached one of the reference temperatures.

15. A temperature controller according to claim 14 and including a third circuit means for controlling the heat source in response to a sensed temperature of cooking oil in the fryer that exceeds one of the reference temperatures.

* * * * *